Nov. 13, 1962
S. A. BERGMAN ETAL
3,063,080
COMBINATION GATE VALVE AND BALL LAUNCHER AND CATCHER
FOR USE IN PRESSURE FLOW LINES
Filed Jan. 11, 1961
4 Sheets-Sheet 1
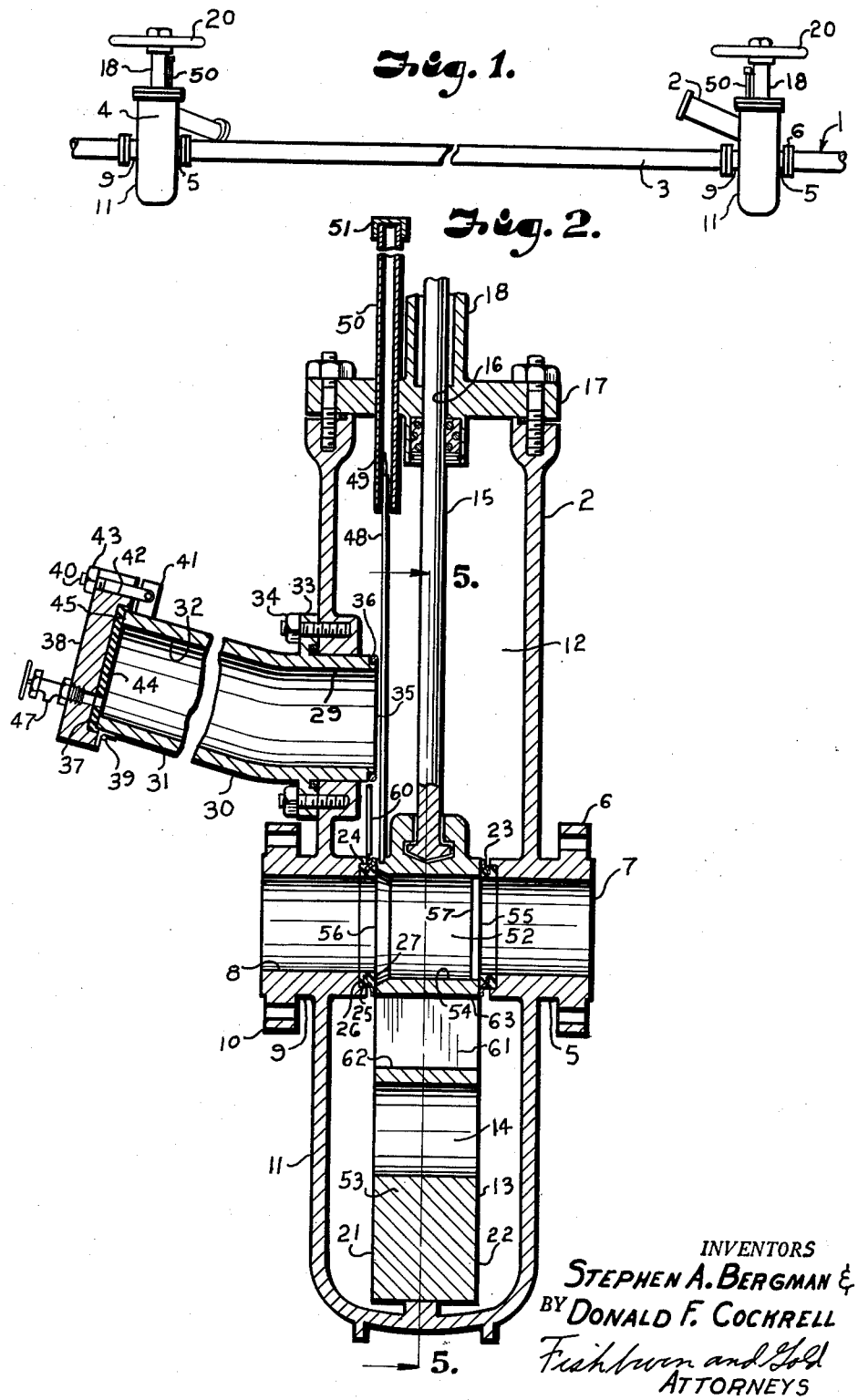
INVENTORS
STEPHEN A. BERGMAN &
BY DONALD F. COCKRELL
Fishburn and Gold
ATTORNEYS

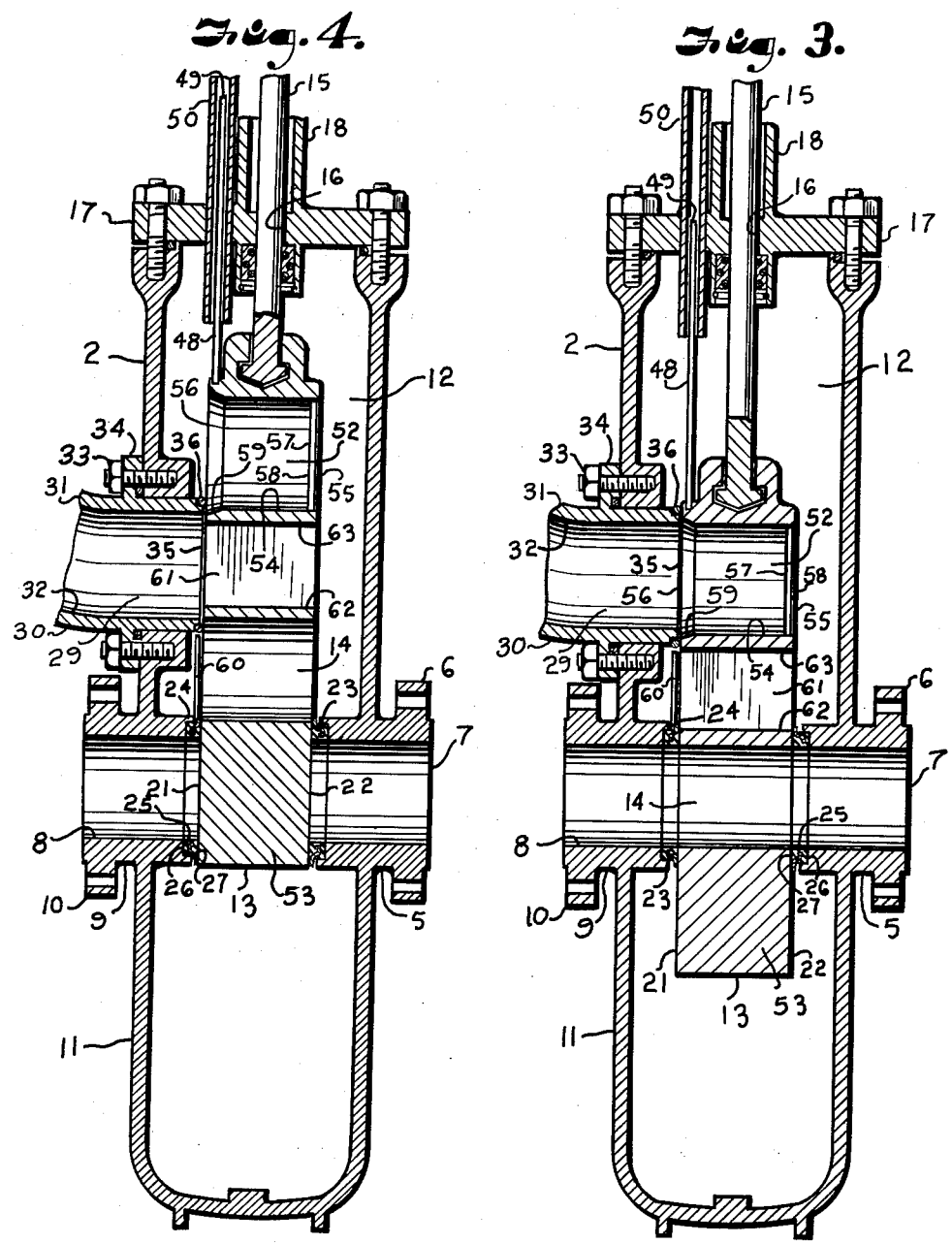

Nov. 13, 1962  S. A. BERGMAN ETAL  3,063,080
COMBINATION GATE VALVE AND BALL LAUNCHER AND CATCHER
FOR USE IN PRESSURE FLOW LINES
Filed Jan. 11, 1961  4 Sheets-Sheet 3

INVENTORS
STEPHEN A. BERGMAN &
BY DONALD F. COCKRELL
Fishburn and Gold
ATTORNEYS

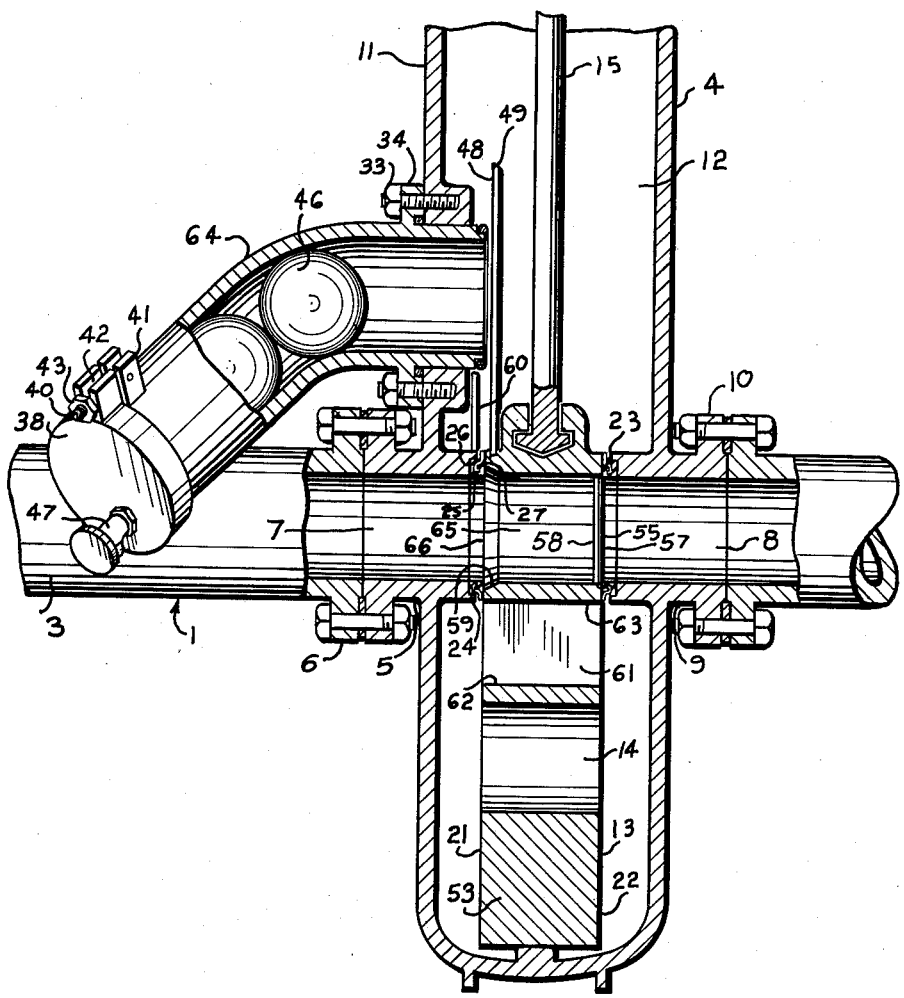

United States Patent Office 3,063,080
Patented Nov. 13, 1962

3,063,080
COMBINATION GATE VALVE AND BALL LAUNCHER AND CATCHER FOR USE IN PRESSURE FLOW LINES
Stephen A. Bergman, Prairie Village, and Donald F. Cockrell, Fairway, Kans., assignors to Panhandle Eastern Pipe Line Company, Kansas City, Mo., a corporation of Delaware
Filed Jan. 11, 1961, Ser. No. 82,052
7 Claims. (Cl. 15—104.06)

This invention relates in general to flow lines for fluid under pressure, and more particularly to apparatus for introduction and removal of devices such as balls or plugs for separation of fluid batches or quantities and/or for cleaning deposits of materials from such lines or conduits.

In fluid pressure flow lines, particularly for carrying petroleum hydrocarbons, the flow is often restricted or subjected to interference by deposition of solid materials on the inner surfaces of the lines. These materials are either derived from the fluid being conveyed through the line or from foreign material carried by the fluid to a point of deposition or adherence to the walls of the line, as for example, in petroleum hydrocarbon lines, such solids deposited on the walls may be paraffins or petroleum hydrates. In order to remove such deposits, corrosion, foreign particles and material, it is conventional practice to insert clean-out plugs or resilient balls in the line and, when flow pressure is applied behind the clean-out device or balls, it forces the devices or balls forwardly through the line, the clean-out devices having engagement with the walls of the pipe line to remove deposits and force same, together with other foreign material, ahead of the clean-out device as it moves through the lines. It is also common practice to provide a plurality of valves, by-passes and branch pipes, traps and the like at each end of a section of pipe line to be cleaned for control of the flow of fluid and also to introduce and remove the cleaning devices from the line. It is also common practice, particularly in liquid flow lines, as in gasoline lines and the like, to use plugs or balls between batches of the liquid to separate same during conveyance through the line. The introduction and removal of the plugs or cleaning devices usually requires special equipment and substantial expense therefor in addition to the normal flow control valves and the like, as well as presenting difficulty due to interruption of flow in the line during introduction or removal of the plug or ball to and from the flow line.

The principal objects of the present invention are to provide a device for use in main flow lines to permit the insertion or removal of separator or cleaner balls or plugs in said pipe line without interfering with the normal use of and flow through such pipe line, eliminating necessity of special branch lines and otherwise eliminating disadvantages heretofore present in cleaning or separating fluids in fluid transmission lines; to provide a device of the character described which is so arranged that the ball or plug may be inserted and removed under pressure or without stopping flow through the pipe line; to provide such a device of the character described which is constantly ready for use after having once been installed in the pipe line; to provide such a device of the character described in the form of a full flow valve structure with a valve member selectively movable to position same for full flow through the line or to a position totally interrupting flow through the line or to a third position in such a device at the up-stream end of a section of pipe line to launch a ball or plug into the line and in such a device at the downstream end of a section to a position for catching the ball or plug when it has progressed through the section; to provide such a combination gate valve and ball launcher or catcher in the form of a full flow gate valve wherein the valve housing has a ball entry spaced from the flow line and the valve member has a ball receiving pocket registrable with the entry in one of the positions of the valve member; to provide a combination valve and ball catcher or launcher in the form of a full flow gate valve wherein the valve housing has a ball receiving portion registrable with a ball receiving pocket in the valve member in one of the positions of the valve member with the valve member movable from the positions of full flow to ball launching or catching positions with substantially no interference with flow through the line; and to provide such a device which is economical to manufacture, efficient in operation and serving as a flow control valve during the normal operations of a fluid transmission line and functioning to introduce or remove balls or plugs from the line when desired.

Other objects and advantages of this invention will become apparent from the following description taken in connection with the accompanying drawings wherein are set forth by way of illustration and example certain embodiments of this invention.

FIG. 1 is a diagrammatic elevational view of a fluid flow pipe line with valve devices embodying the features of the present invention at opposite ends of a pipe line section.

FIG. 2 is a vertical sectional view through the combination valve and ball launcher, with the valve member in ball launching position.

FIG. 3 is a fragmentary vertical sectional view through the combination valve and ball launcher, with the valve member in position for full flow through the line.

FIG. 4 is a fragmentary vertical sectional view through the combination valve and ball launcher with the valve member positioned to shut off flow through the pipe line.

FIG. 7 is a sectional view through a modified form of valve fitting in the form of a combination valve and ball catcher, with the valve member in ball catching position.

Figure 5:
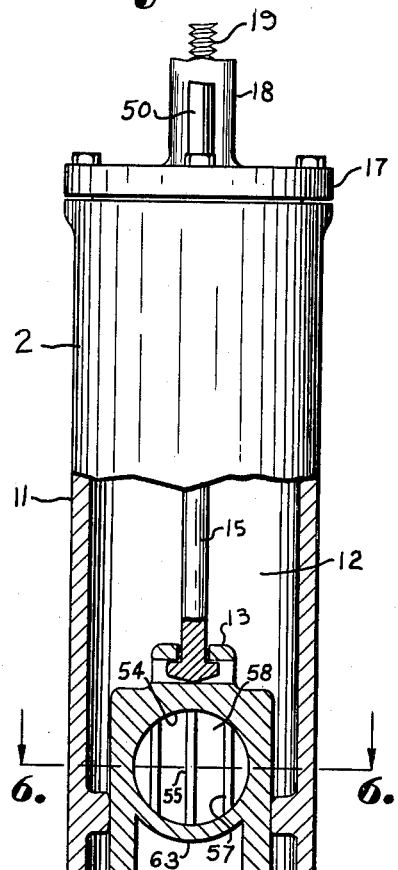
FIG. 5 is an end elevation of the combination valve and ball launcher with portions broken away on the line 5—5, FIG. 2, to illustrate the valve member structure.

Referring more in detail to the drawings:

1 designates a fluid pressure flow line having a combination valve and ball or plug launcher 2 at the upstream end of the section 3 and a combination valve and ball or plug catcher 4 at the downstream end of said section, the section 3 being of any desired length between control points which may be, for example, eight miles in length. The valve fittings 2 and 4 preferably are of full flow type having an inlet end 5 adapted to be connected to an adjacent end of a pipe section upstream therefrom as by a flange connection 6. The inlet branch 5 has an inlet passage 7 of the same cross-sectional size and shape as the inside of the pipe 1, the passage 7 aligning with an outlet passage 8 having the same cross-sectional size and shape and being in an outlet branch 9 connected to the upstream end of the pipe line section 3 by a flange connection 10. The inlet branch 5 and outlet branch 9 are oppositely disposed and fixed in a housing 11 having a chamber 12 therein in communication with the inner ends of the inlet and outlet passages 7 and 8 respectively.

A valve member 13 is movable in the chamber 12 and has a full flow bore or passage 14 extending therethrough and adapted to register with the inlet and outlet passages 7 and 8 when the valve member is in one position, as illustrated in FIG. 3. In the illustrated structure, the valve fitting 2 is in the general form of a gate valve wherein the housing 11 and chamber 12 therein are elongated, and the valve member 13 forms a gate movable in said chamber, said valve member being actuated by an suitable operating structure. In the structure illustrated, the valve member 13 has a stem 15 extending upwardly therefrom through a bore 16 in a cover plate 17 which carries a valve bonnet 18. The stem 15 has a threaded portion 19 operatively connected with moving apparatus (not shown) for moving the valve member as by rotation of a hand wheel 20 or operation of other actuating mechanism as in conventional practice for moving of gate valve members to the various positions in the valve housing. The valve member 13 has opposed faces 21 and 22 adapted to be engaged by suitable seal means 23 which encompass or encircle the inner ends of the inlet and outlet passages 7 and 8. In the illustrated structure, the inner ends of the branches 5 and 9 have recesses 24 and seal members or rings 25 have portions 26 extending into said recesses and having sealing engagement to effect a fluid seal. The inner faces 27 of the rings 25 substantially engage the faces 21 and 22 of the valve member to effect a seal between the faces 27 and the faces 21 and 22 to form an effective seal between the housing or inlet and outlet branches 5 and 9 thereof and the valve member 13 in the various positions of the valve member. However, the valve body 11 is preferably of a structure wherein the chamber 12 is fluid pressure tight to retain fluid therein that will enter same from the flow line during movement of the valve member 13 to its different positions.

A plug or ball entry 29 is arranged in the housing 11 and spaced from the outlet branch 9 in a direction longitudinally of the path of movement of the valve member 13. In the structure illustrated, the ball or plug entry 29 forms a portion of a ball or plug holder 30 which includes a tubular member 31 having a bore 32 slightly larger than the passages 7 and 8 whereby balls or plugs adapted to fit and be movable with flow through the pipe line will be freely movable in the bore 32. The entry end of the holder 30 extends into the housing 11 and the holder is suitably secured thereto as by a flange 33 and studs and nuts 34 with the inner end of the bore 32 being substantially parallel with the passage 8 and in communication with the chamber 12, said tube terminating at its inner end in a face 35 preferably spaced slightly outwardly of the path of the face 21 of the valve member, and a compressible seal member 36 is arranged at said outer end and adapted to engage the face 21 as the valve member is moved or positioned at the inner end of the holder, as illustrated in FIGS. 3 and 4. The outer open end 37 of the bore 32 is normally closed by a cover 38 removably mounted on the holder 30. In the illustrated structure, the cover member is swingably mounted by hinge means 39 and is secured in closed position by suitable fastening device such as a bolt 40 pivoted on an ear 41 and engageable in a recess or groove 42 with a nut 43 threaded on said bolt in engagement with said cover member. A gasket member 44 is interposed between the cover 38 and the outer end 45 of the tube 31 to provide a fluid-tight seal therefor. The tubular member 31 is preferably of a suitable length whereby a plurality of plugs or balls 46 may be contained therein for selective introduction into the flow line, and a suitable pressure release valve 47 is arranged on the holder for selective release of the pressure in the bore 32 and chamber 12 whereby the cover plate 38 may be removed for insertion of additional balls or plugs 46.

The valve member 13 has a barrier member 48 such as a bar or rod fixed on the upper end of the valve member and extending upwardly therefrom adjacent the entry end of the bore 32 to retain the balls or plugs in the bore 32 during the time the valve member is positioned below the opening as illustrated in FIG. 2. Due to the length of movement of the valve member and relative length of the housing 11, the upper end 49 of the rod 48 extends into a tubular guide 50 mounted in the flange 17 and extending upwardly therefrom and terminating in a closed end 51 to provide suitable length for movement of the rod 48 in a housing structure that will retain pressure in the chamber 12. It is preferable that the tubular portion 31 be inclined upwardly and outwardly from the inner or entry end thereof whereby the balls or plugs 46 will move by gravity in the bore 32 and into a pocket 52 in the valve member 13 when said pocket is in registry with the entry opening of the bore 32, as later described.

Figure 6:
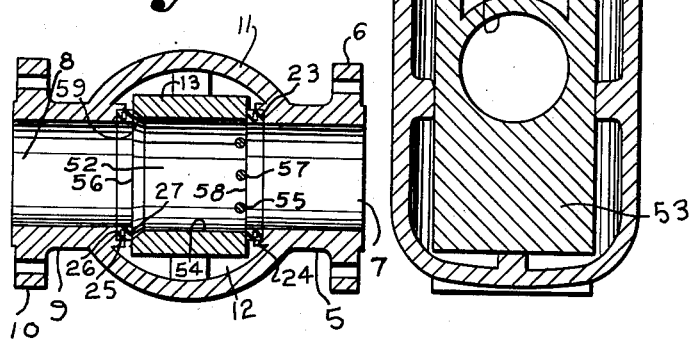
FIG. 6 is a horizontal sectional view through the combination valve and ball launcher on the line 6—6, FIG. 5.

The valve member 13 is of substantial length and has a solid portion 53 adapted to be moved between the seals 23 to shut off flow through the pipe line. It is preferable that the valve closing portion 53 be at one end of the valve member and the pocket 52 at the other end with the full flow bore 14 therebetween. In the illustrated structure, when the valve member is in its position for full flow through the fitting 2, as illustrated in FIG. 3, a pocket-forming bore 54 registers with the inner end of the bore 32 for movement of a ball or plug 46 therein. An open barrier 55 is arranged in the valve member 13 to extend across the bore 54 in spaced relation to the open end 56 registering with the bore 32, the spacing being such that the plug or ball entering the pocket 52 will be wholly within the confines of the pocket and inwardly from the face 21 of the valve member. The barrier 55 in the illustrated structure is in the form of elongate bars or rods 57 arranged in spaced relation to provide flow openings 58 therebetween, as illustrated in FIGS. 2 and 6. It is preferable that the end 56 of the pocket be bevelled outwardly as at 59 to facilitate movement of the ball or plug into the pocket and that the remaining portion of the pocket between the bevelled portion 59 and the barrier 55 have slight frictional engagement with the surface of the ball or plug 46 therein to lightly retain the ball or plug therein until it is forced out by pressure. In order to prevent the ball or plug from moving from the pocket during movement of the valve member to a position to align the pocket with the passage 8, as illustrated in FIG. 2, a wall or guard member 60 is secured to the inner end of the branch 9 and extends therefrom to the inner end of the entry member 29 and has only slight spacing from the face 21 of the valve member as illustrated in FIG. 2.

The pocket-forming bore 54 is spaced from the through bore 14 and the valve member 13 has through passages 61 in the portion thereof between said bores to eliminate any interruption of flow through the fitting 2 during movement between the full flow position of the valve member as illustrated in FIG. 3 and the ball launching position as illustrated in FIG. 2 whereby the structure is particularly adapted for use in liquid flow lines and operable to introduce balls or plugs into the line without sudden interruption of flow or increase in pressure upstream therefrom due to inertia of the flow stream. In the structure illustrated, the bores 14, 54 and passage 61 are in the form of an elongate opening with spaced walls or partitions 62 and 63 extending thereacross to cooperate with the ends of the opening to define the bores 14 and 54 respectively, as illustrated in FIG. 5. When the valve member 13 is moved into registry with the passage 8, with the ball in the pocket 52, the upstream pressure of the fluid will apply force through the openings 58 to the ball or plug forcing same from the pocket 52 for movement through the passage 8 and through the section 3 of the pipe line with the flow of fluid passing therethrough.

The valve member actuator for moving the valve member to its different positions may be manual, motorized or other conventional operating structures used for gate and like valves. It is also contemplated that the cross section of the housing and valve member may be of various shapes such as used in gate valves providing the length through the full flow bore and plug receiving pocket is greater than the length or diameter of the plug or ball.

In the form of the invention illustrated in FIG. 7, the structure is a gate valve and plug or ball catcher wherein the housing 11 and valve operating structure are the same as the valve and launcher structure illustrated in FIG. 2 except that the plug or ball holder 64 is on the opposite side of the housing or on the side thereof toward the upstream portion of the pipe line, and the valve member 13 has a ball receiving pocket 65 with the open end 66 registering with and on the side toward the passage 7 of the inlet branch 5. The valve member 13 is preferably the same structure as used in the ball launcher. The ball or plug holder 64 is the same as the holder 30 except that the portion thereof extending from the housing 11 is inclined outwardly and downwardly for gravitational movement of the balls or plugs toward the cover of the outer end thereof.

In using a structure as illustrated and described, with the ball or plug launcher 2 and catcher 4 positioned at the ends of a pipe line section 3, as illustrated in FIG. 1, and with the valve members 13 in full flow position, the flow of the fluid through the pipe line is as in normal operation. If it is desired to stop flow of the fluid through the pipe line at either of the positions at the ends of the section 3, the valve member of the respective fitting may be acuated to move same to its flow closing position wherein the portion 53 is disposed between the passages 7 and 8 to stop all flow therethrough. When it is desired to clean the section 3 or to separate batches of liquid, the valve member of the fitting 2 is moved to full flow position, as illustrated in FIG. 3, and then the valve 47 is opened to bleed the pressure from the bore 32 and chamber 12 whereby the cover 38 may be removed and suitable balls or plugs inserted into the bore 32 of the holder 30. The cover is then reapplied to the holder to close and seal the outer end thereof and the valve 47 closed, with a plurality of plugs or balls in the bore 32 ready for insertion and launching into the flow line as desired. In the structure illustrated with the valve member 13 in full flow position, the innermost ball or plug moves into the pocket 52 and then, by actuation of the valve member operating mechanism, the valve member is moved to move the pocket toward the passage 8. During such movement, the guard or wall 60 retains the ball in the pocket 52 and flow through the fitting is maintained through the bore 14 and passage 61. As the pocket 52 moves into registry with the outlet passage 8, the pressure and flow upstream of the fitting will move through the openings 58 to force the ball or plug from the pocket 52 and through the passage 8 and into the bore of the pipe line section 3. After the ball or plug is started on its travel through the pipe line section, if it is desired to remove the ball at the end of the section 3, the valve member moving structure of the fitting 4 is operated to move the valve member in said fitting to the ball catching position, as illustrated in FIG. 7, whereby the pocket 65 aligns with the passage 7, the openings 58 between the portions of the barrier 55 permitting flow through the pocket-forming bore. While the flow will continue through the fitting 2 to force the ball or plug through the pipe line section 3, after the ball is launched it is usually desirable to move the valve member 13 of said fitting back to the full flow position wherein the bore 14 registers with the passages 7 and 8 as illustrated in FIG. 3. It is possible to tell by the sound, as well as accurate calculations, as to the movement of a ball or plug through the pipe line section 3 so as to know when it is received in the catcher pocket 65, and preferably immediately upon said ball being deposited in said pocket 65 the valve operating mechanism is actuated to move the valve member 13 of the fitting 4 whereby the opening to the pocket 65 registers with the opening of the bore of the holder 64, and the full flow passage through the valve member registers with the passages 7 and 8 for full flow through the pipe line, and registry of the pocket 65 with the bore of the holder 64 allows the ball or plug to move from the pocket into the holder for collection and later removal.

It is to be understood that while we have illustrated and described certain forms of our invention, it is not to be limited to the specific forms and arrangements of parts herein described and shown except insofar as such limitations are included in the claims.

What we claim and desire to secure by Letters Patent is:

1. In a full flow gate valve having a housing with an elongate chamber communicating with a pipe line through aligned inlet and outlet passages and an elongate gate valve member movable in said chamber and having opposed faces and a through elongate opening arranged longitudinally of said valve member and extending between said opposed faces, spaced walls in said gate valve member of lesser width than said inlet and outlet passages and arranged across said elongate opening to define a through passage between said walls, said spaced walls cooperating with ends of said elongate opening to define a full flow bore and a plug receiving pocket spaced apart longitudinally of said valve member, said full flow bore being registrable with said inlet and outlet passages in a one position of the valve member and said plug receiving pocket being registrable with one of the inlet and outlet passages in another position of the valve member, a plug entry in the housing registrable with said pocket in said one position of the valve member, means in said receiving pocket spaced from the face toward the plug entry to form a barrier and having apertures for connecting said pocket with the other of the inlet and outlet passages when the valve member is in said other position for flow of fluid therethrough, said elongate opening and spaced walls therein being positioned whereby said through passage provides substantially uninterrupted flow of fluid in said pipe line during movement of said valve member between said one and other positions, and a portion of the gate valve member closing flow through the passages in a third position of said valve member.

2. In a full flow gate valve having a housing with an elongate chamber communicating with a pipe line through aligned inlet and outlet passages and an elongate gate valve member movable in said chamber and having opposed faces and a through elongate opening arranged longitudinally of said valve member and extending between said opposed faces, spaced walls in said gate valve member of lesser width than said inlet and outlet passages and arranged across said elongate opening to define a through passage between said walls, said spaced walls cooperating with ends of said elongate opening to define a full flow bore and a plug receiving pocket spaced apart longitudinally of said valve member, said full flow bore being registrable with said inlet and outlet passages in a one position of the valve member and said plug receiving pocket being registrable with one of the inlet and outlet passages in another position of the valve member, a plug entry in the housing registrable with said pocket in said one position of the valve member, means in said receiving pocket spaced from the face toward the plug entry to form a barrier and having apertures for connecting said pocket with the other of the inlet and outlet passages when the valve member is in said other position for flow of fluid therethrough, said elongate opening and spaced walls therein being positioned whereby said through passage provides substantially uninterrupted flow of fluid in said pipe line during movement of said valve member between said one and other positions, a portion of the gate valve member closing flow through the passages in a third position of said valve member, a valve stem supported by said housing for movement toward and away from said chamber, and means for selectively actuating said valve stem for moving said valve member to said one position, other position and third position.

3. In a full flow gate valve having a housing with an elongate chamber communicating with a pipe line through aligned inlet and outlet passages and an elongate gate valve member movable in said chamber and having opposed faces and a through elongate opening arranged longitudinally of said valve member and extending between said opposed faces, spaced walls in said gate valve member and arranged across said elongate opening to define a through passage therebetween, said spaced walls being of lesser width than said inlet and outlet passages and cooperating with ends of said elongate opening to define a full flow bore and a plug receiving pocket spaced apart longitudinally of said valve member, said full flow bore being registrable with said inlet and outlet passages in a one position of the valve member and said plug receiving pocket being registrable with one of the inlet and outlet passages in another position of the valve member, a plug entry in the housing registrable with said pocket in said one position of the valve member, means in said receiving pocket spaced from the face toward the plug entry to form a barrier and having apertures for connecting said pocket with the other of the inlet and outlet passages when the valve member is in said other position for flow of fluid therethrough, said elongate opening and spaced walls therein being positioned whereby said through passage provides substantially uninterrupted flow of fluid in said pipe line during movement of said valve member between said one and other positions, a portion of the gate valve member closing flow through the passages in a third position of said valve member, a valve stem supported by said housing for movement toward and away from said chamber, means for selectively actuating said stem for moving said valve member to said one position, other position and third position, and means substantially engaging the face of the valve member adjacent the entry to retain a plug in said pocket during movement of the valve member from a position wherein said pocket registers with the entry to a position wherein said pocket registers with the outlet passage.

4. A device for controlling flow in a pipe line and for introducing a plug device into said pipe line for movement therethrough comprising, a valve housing having a chamber therein and aligned inlet and outlet passages intersecting said chamber, a valve member movable in said chamber and having a through bore the same size and registrable with said inlet and outlet passages in one position of said valve member, said valve member having a second bore spaced from the first-named bore and having one end registrable with one of said passages when the valve member is moved to a second position, means in said second bore adjacent the other end thereof for preventing movement of a plug therethrough while permitting flow of fluid therethrough, said second bore between said one end and the plug restraining means being of a size to receive a plug device therein, a plug device holder having an entry passage in said housing registering with said one end of said second bore when the valve member is in said first position for inserting and removing a plug device in said second bore while full flow in a pipe line is permitted through the first-named bore, said valve member having a through opening extending from adjacent said first and second-named bores for substantially uninterrupted flow through said passages during movement of the valve member to and from said first and second positions, means sealingly engaging the housing and valve member in encircling relation to said inlet and outlet passages, and actuating means for selectively moving said valve member to the first and second positions.

5. A device for controlling flow in a pipe line and for introducing a plug device into said pipe line for movement therethrough comprising, a valve housing having a chamber therein and aligned inlet and outlet passages intersecting said chamber, a valve member movable in said chamber and having a through bore the same size and registrable with said inlet and outlet passages in one position of said valve member, said valve member having a second bore spaced from the first-named bore and having one end registrable with one of said passages when the valve member is moved to a second position, means in said second bore adjacent the other end thereof for preventing movement of a plug therethrough while permitting flow of fluid therethrough, said second bore between said one end and the plug restraining means being of a size to receive a plug device therein, a plug device holder having an entry passage in said housing registering with said one end of said second bore when the valve member is in said first position for inserting and removing a plug device in said second bore while full flow in a pipe line is permitted through the first-named bore, said valve member having a through opening extending from adjacent said first and second-named bores for substantially uninterrupted flow through said passages during movement of the valve member to and from said first and second positions, a portion of said valve member closing flow through said inlet and outlet passages when the valve member is in a third position, means extending between the entry passage and the outlet passage to retain a plug device in the plug receiving pocket as the valve member is moved from said one position to said second position, means movable in response to movement of the valve member to form a barrier at said entry to retain plugs in the holder, means sealingly engaging the housing and valve member in encircling relation to said inlet and outlet passages, and actuating means for selectively moving said valve member to the first, second and third positions.

6. A device as defined in claim 5 wherein the plug holder is inclined upwardly and outwardly from the entry opening in the housing for gravitational movement of plugs into the second bore when said second bore is registered with said plug entry opening, and barrier means movable in response to movement of the gate valve member for retaining plugs in the holder when said second bore is out of registry with the holder entry opening.

7. A device as defined in claim 5 wherein the plug holder is inclined outwardly and downwardly from the entry opening in said housing for gravitational movement of the plugs from the second bore into said holder when said second bore is in registry with the entry opening of said holder.

References Cited in the file of this patent

UNITED STATES PATENTS

| | | |
|---|---|---|
| 584,885 | Mathis | June 22, 1897 |
| 1,633,161 | Cavenagh | June 21, 1927 |
| 2,601,304 | Lane | June 24, 1952 |
| 2,623,226 | Jones et al. | Dec. 30, 1952 |
| 2,713,909 | Baker | July 26, 1955 |